DIGITAL COMPUTING ENGINES

Filed May 27, 1955 3 Sheets-Sheet 1

Inventor
EDWARD J. PETHERICK
By
Stevens, Davis, Miller & Mosher
Attorneys

Inventor
EDWARD J. PETHERICK
By
Stevens, Davis, Miller & Mosher
Attorneys

Inventor
Edward John Petherick
By
Stevens, Davis, Miller & Mosher
Attorneys 2,933,250

DIGITAL COMPUTING ENGINES

Edward John Petherick, Rowledge, near Farnham, England, assignor to International Business Machines Corporation, New York, N.Y., a corporation of New York Application May 27, 1955, Serial No. 511,696

Claims priority, application Great Britain June 3, 1954

8 Claims. (Cl. 235—159)

Figure 1A:
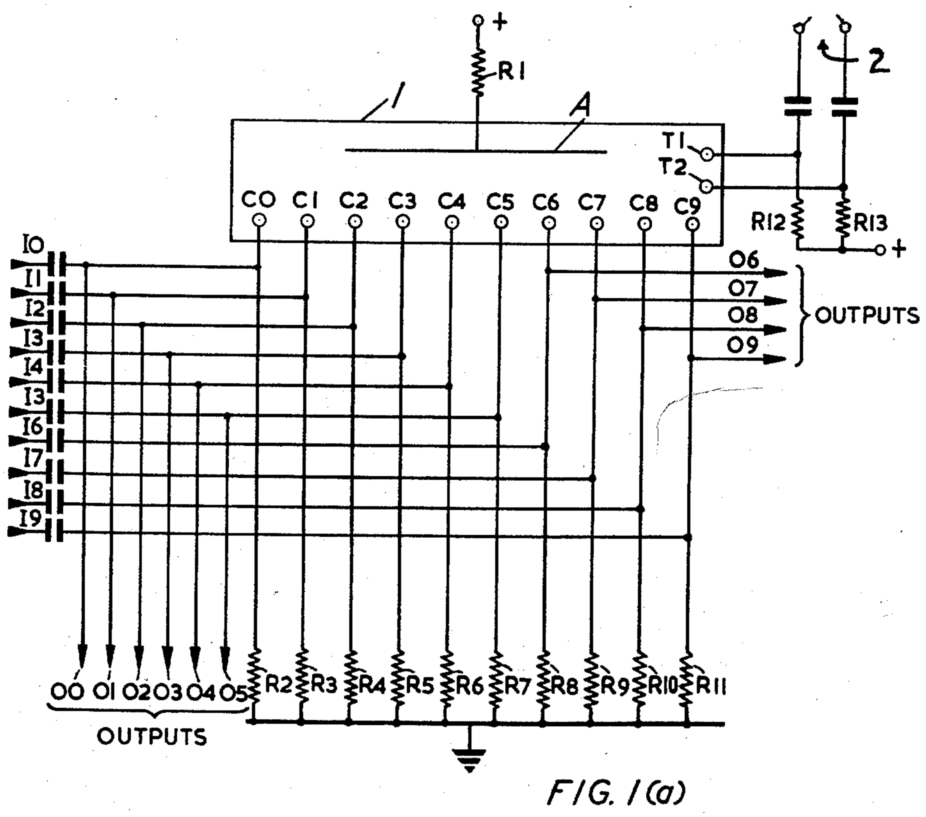

The present invention relates to digital computing engines which work in the decimal scale of notation.

In a computing engine during the process of multiplication, the multiplicand is normally stored in an arithmetical register and the product of the multiplicand and a multiplier is added to (or possibly subtracted from) the contents of an accumulator. This addition may take the form of successive additions of the multiplicand to the contents of the accumulator, the number of additions depending upon the value of a multiplier digit. These successive additions are then made for each multiplier digit in turn. Alternatively, multiples of the multiplicand may be added to the contents of the accumulator, the multiples being the product of the multiplicand and a multiplier digit or of the multiplicand and a multiplier factor derived from one or more multiplier digits. The present invention is concerned with the derivation of multiplier factors in the last-described manner of operation.

In co-pending patent application No. 415,609 there is described a computing engine designed to operate in this manner. In the engine therein described, coded multiplier digits are fed sequentially from a store in an order of decreasing significance to a two-stage shifting register. The appropriate multiplier factor is derived by comparing the values of the two multiplier digits held in the register and suitably modifying the effect of the more significant of the two digits if this is called for by the comparison. Because the comparison involves a multiplier digit and its next less significant neighbour and because the multiplier digits are fed to the multiplier register in an order of decreasing significance it follows that the register must have two stages in order that the less significant of the multiplier digits may be stored in its fully coded form ready for the derivation of the next multiplier factor.

According to the present invention, however, a translator for deriving multiplier factors from a succession of multiplier digits comprises a multiplier register arranged to receive single multiplier digits successively in an order of increasing significance, means for determining if a multiplier digit held in the register is a digit N which is less than five of a digit $(9-N)$ which is greater than four, means for recording the digit N, and output means for indicating a multiplier factor F such that:

(1) If the multiplier digit held in the register is less than five (*a*) F equals N if the next less significant multiplier digit previously held in the register was less than five, or (*b*) F equals $(N+1)$ if the next less significant multiplier digit previously held in the register was greater than four, or (2) If the multiplier digit held in the register is greater than four.

(*a*) F equals minus N if the next less significant multiplier digit previously held in the register was greater than four or (*b*) F equals minus $(N+1)$ if the next less significant multiplier digit previously held in the register was less than five.

The principle on which the derivation of multiplier factors depends is basically similar to that employed in the computing engine described in co-pending patent application No. 415,609.

In order to understand the validity of this principle it must first be appreciated that in decimal arithmetric, direct multiplication by a multiplier digit greater than five is not necessary because such a multiplication may be effected by increasing the digit of next higher significance in the multiplier by one and multiplying by a multiplier factor of minus the complement on 10 of the digit greater than five. This will become clearer if an example be considered:

To multiply a multiplicand M by 27, multiply by 30, then by 3 $(=10-7)$ and subtract the second product from the first.

Thus: $27M=(30-3)\ M=30M-3M$

This rule, as applied to the present invention, may be codified as follows:

Inspect each digit of the multiplier in turn in an order of increasing significance, meanwhile memorising whether the previous, next less significant, multiplier digit was less than five or greater than four, and multiply by a multiplier factor, F, according to the following table:

*Table 1*

| Multiplier digit N, inspected | | 0 | 1 | 2 | 3 | 4 | 5 | 6 | 7 | 8 | 9 |
|---|---|---|---|---|---|---|---|---|---|---|---|
| Multiplier factor, F, required if the previous multiplier digit was | $<5$ | 0 | 1 | 2 | 3 | 4 | −5 | −4 | −3 | −2 | −1 |
| | $>4$ | 1 | 2 | 3 | 4 | 5 | −4 | −3 | −2 | −1 | −0 |

The process starts at the least significant digit of the multiplier, this digit being considered to be preceded by a zero. Similarly the most significant digit of the multiplier is considered to be followed by a zero.

Figure 1B:
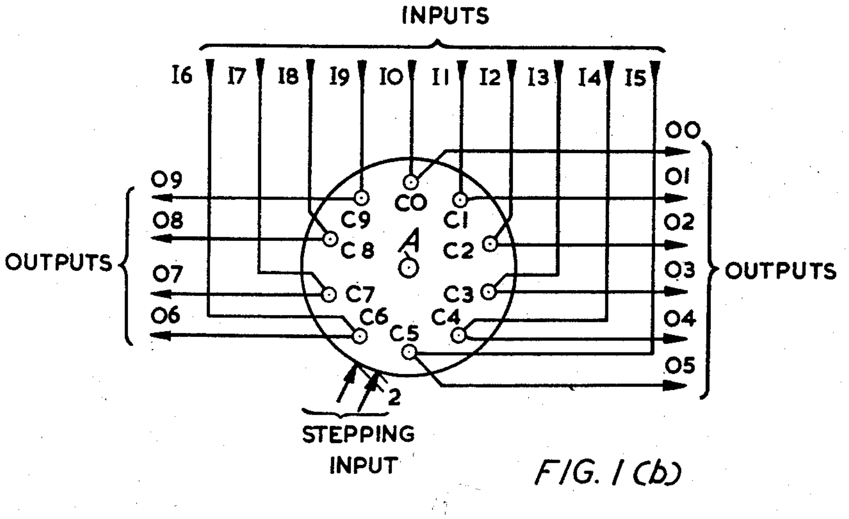
Figure 2:
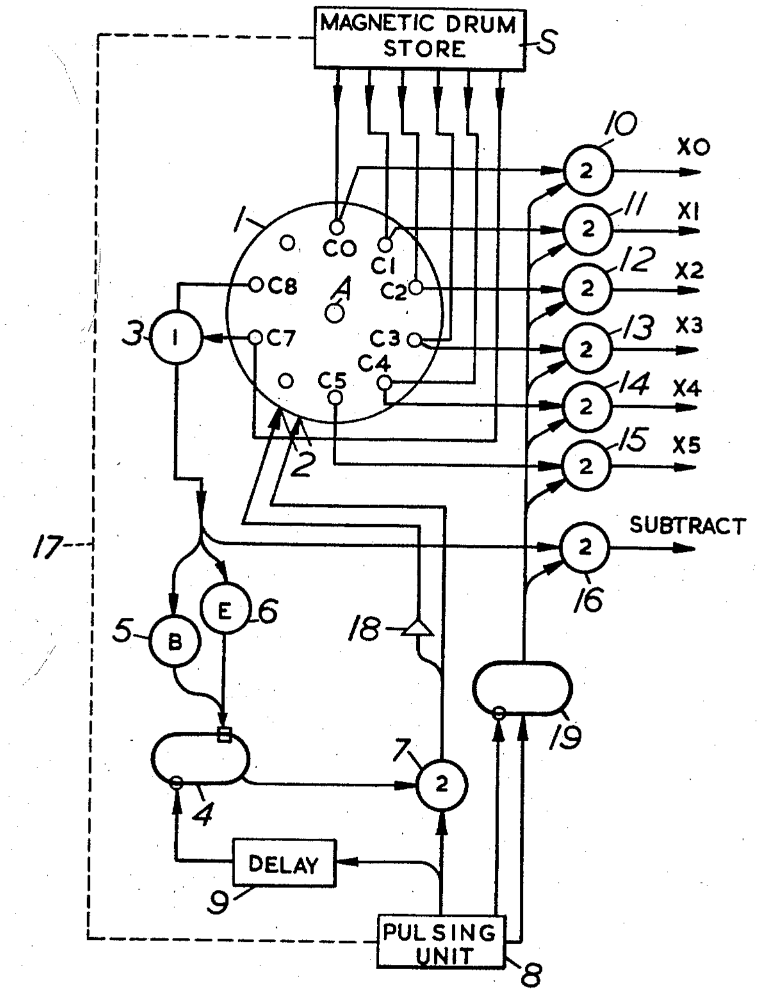
Figure 3:
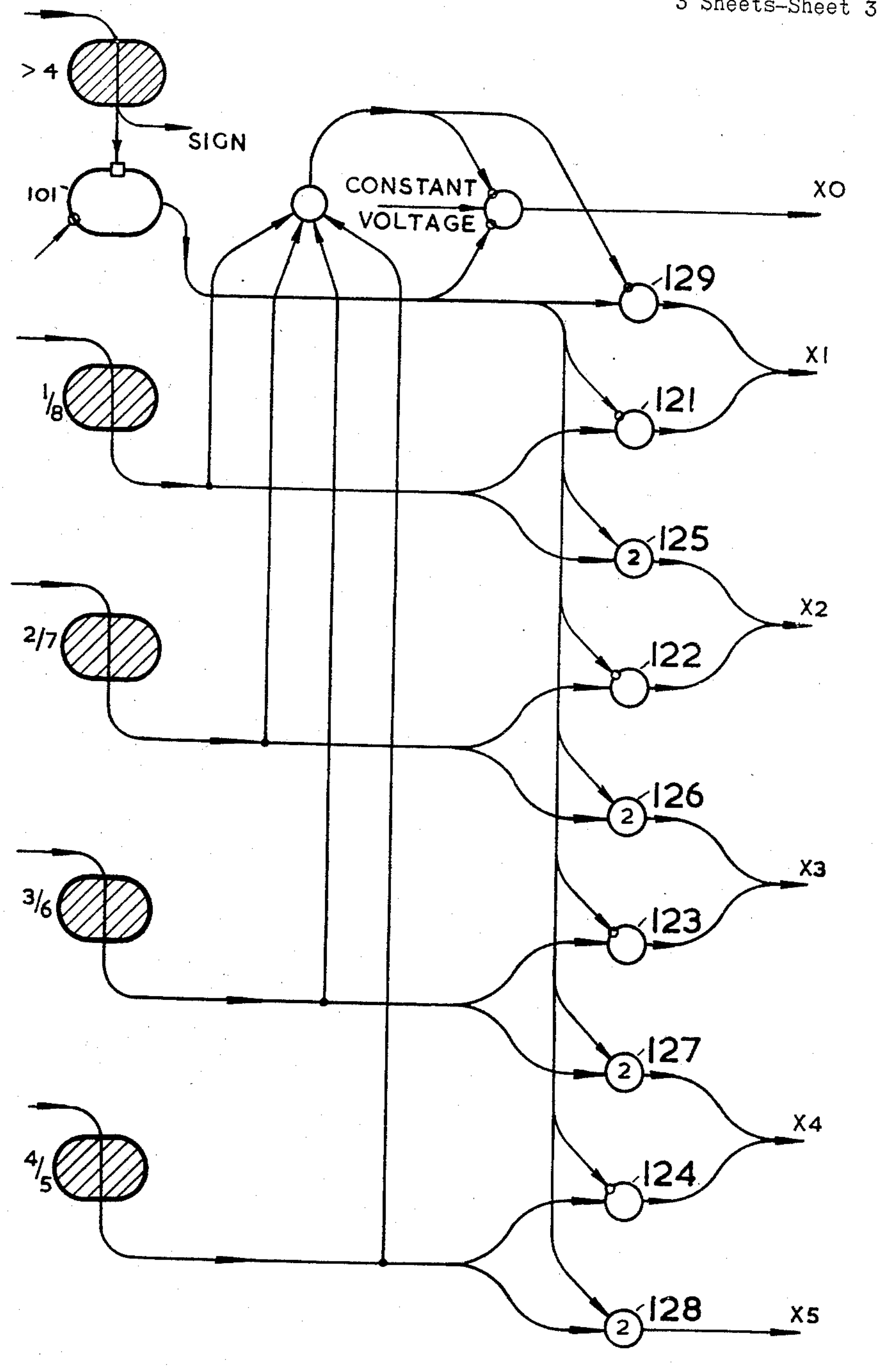

In order that the present invention may be more clearly understood, an embodiment thereof will now be described, by way of example, with reference to the accompanying drawings, in which:

Figure 1 is a circuit diagram of a cold cathode switching tube circuit and is explanatory of the symbol used therefor in Figure 2, Figure 2 is a circuit diagram of a translator for deriving multiplier factors from the digits of a multiplier, and Figure 3 is a circuit diagram of a further translator for deriving multiplier factors from the digits of a multiplier.

Figure 1(*a*) shows a cold cathode switching tube 1. Such a switching tube is sold under the trade designation GS10C. This tube has a common anode A and ten cathodes C0 to C9 each having a separate output for connection to external circuits. The anode A is connected to a positive voltage source through a resistor R1. The cathodes C0 to C9 are connected to earth through cathode resistors R2 to R11 respectively. The cathodes C0 to C9 are connected to ten input lines I0 to I9 respectively through capacitors. The cathodes C0 to C9 are also connected directly to ten output lines O0 to O9 respectively.

The switching tube 1 also has two transfer electrodes T1 and T2 which are connected to a source of positive voltage through resistors R12 and R13 respectively. They are also each connected to a stepping input 2 through a capacitor.

By the application of a negative-going pulse to any one of the inputs I0 to I9 a discharge may be established between the anode A and the corresponding one of the cathodes C0 to C9. By applying negative-going pulses simultaneously to more than one input, more than one discharge path may be established. When a discharge is established, between the anode and a cathode, the cathode voltage rises providing an output in the form of an increased voltage on the appropriate output line of the output lines O0 to O9. By applying negative-going pulses in succession to first one and then the other of the transfer electrodes T1 and T2 via the stepping input 2, the discharge to a cathode may be shifted to its immediately neighbouring cathode in a given direction. Thus, for example, a discharge to the cathode C0 may be shifted to the cathode C1.

In order to clear the contents of the switching tube, all that is necessary is that a negative pulse should be applied to one of the cathodes, for examples the cathode C0 or the cathode C6, when the discharge will leave any of the other cathodes and go solely to the cathode to which the negative-going pulse is applied.

Figure 1(*b*) shows a diagrammatic representation of the circuit shown in Figure 1(*a*). The switching tube is represented by the numeral 1, the input lines to the cathodes C0 to C9 are shown at I0 to I9 respectively and the output lines from the cathodes C0 to C9 are shown at O0 to O9 respectively. The stepping input is shown at 2.

Figure 2 shows a circuit diagram of a translator for deriving multiplier factors from the digits of a multiplier. The notation used for the cold cathode-switching tube in the figure is the same as that illustrated in Figure 1. The notation used for the other circuit elements shown in Figure 2 is similar to that described in the specification of Patent No. 2,686,632. For example, "B" and "E" elements are described with reference to Figs. 7, 8 and 9 in Patent No. 2,686,632.

Figure 2 shows a magnetic drum store S in which digits are stored in a six-element code to be described hereinafter. There are six outlets from the store S each corresponding to one code element. Each of the outlets is connected to a cathode of a cold-cathode switching tube 1 which forms the multiplier register. The cold-cathode switching tube 1 has a central anode A and ten cathodes, eight of which are designated as in Figure 1, C0, C1, C2, C3, C4, C5, C7 and C8.

The outputs lines from the cathodes C0 to C5 are taken to lines X0, X1, X2, X3, X4 and X5 via AND gates 10 to 15 respectively. The outputs from the cathodes C7 and C8 are each taken to a mixer or OR gate 3. The output of the gate 3 is connected to a changeover input of a trigger 4 through a beginning element 5 and an end element 6 connected in parallel. The output of the gate 3 is also taken to a line designated Subtract via an AND gate 16.

The output of the trigger 4 is connected to an AND gate 7 which is fed with pulses from a pulsing unit 8. This pulsing unit comprises a number of phonic wheels by which the operation of the whole engine is timed.

The phonic wheels comprise a number of iron wheels having lines engraved on them at the requisite points to give, in conjunction with magnetic reading heads, control pulses at the appropriate times. In order that the control pulses may be produced at the correct times in relation to signals from the magnetic drum stores, the phonic wheels are driven directly from the magnetic drum as indicated by the dotted line 17. The phonic wheels may, alternatively, take the form of a copper disc having lines etched along circular tracks on one side thereof. These lines are filled with magnetic material and cooperate with magnetic reading heads to provide control pulses at the appropriate times. In order to keep the number of phonic wheels or tracks and the reading heads to a minimum number, the outputs from the reading heads may be fed to AND gates so that outputs are given on various output lines from the pulsing unit only when the outputs from the reading heads coincide.

The output from the AND gate 7 is applied to the stepping input 2 of the cold cathode switching tube 1 via two lines one of which includes a small delay unit 18. Pulses from the pulsing unit 8 are also applied to the trigger 4 through a delay line 9 so as to put, or try to put, the trigger 4 off. A trigger 19 is connected to the pulsing unit 8 so that one pulse from the pulsing unit puts the trigger on and another pulse from the pulsing unit puts the trigger off. The output from the trigger 19 is applied to the AND gates 10 to 16 to open them when the trigger is on.

The operation of the circuit is as follows. The successive digits of the multiplier are fed sequentially in an order of increasing significance from the store S, which may, for example, be a magnetic drum store, to the tube 1. Thus, firstly the least significant multiplier digit is fed to the tube 1.

The digits fed from the store S to the tube 1 are coded in the form of the six-element code set out in the following table. Pulses representing a digit are derived from the store S and applied to the tube 1 in accordance with the code and set up anode-cathode discharges in the tube 1 so that these discharges represent the digit.

*Table 2*

| Decimal Digit | Code Elements | | | | | |
|---|---|---|---|---|---|---|
| | 0/9 | 1/8 | 2/7 | 3/6 | 4/5 | >4 |
| 0 | x | | | | | |
| 1 | | x | | | | |
| 2 | | | x | | | |
| 3 | | | | x | | |
| 4 | | | | | x | |
| 5 | | | | | x | x |
| 6 | | | | x | | x |
| 7 | | | x | | | x |
| 8 | | x | | | | x |
| 9 | x | | | | | x |
| | C0 | C1 | C2 | C3 | C4 | C7 |
| | Discharge to Cathode(s) | | | | | |

In this table, the symbol $x$ denotes the code element or elements used to signify the various digits. The symbol $x$ also denotes the various anode-to-cathode discharge paths in the cold cathode switching tube 1, which signify the various decimal digits when these discharge paths are flashed. Thus, for example, when the digit 4 is set up on the tube 1 it is coded as the code element 4/5 so that a discharge is set up between the anode A and the cathode C4. However, when the digit 5 is set up on the tube 1 it is coded as the code elements 4/5 and >4 so that discharges are set up between the anode A and the cathodes C4 and C7. It will be seen that a discharge between the anode A and the cathode C7 is set up only when the digit set up on the tube 1 is greater than four, whereas the other discharges between the anode A and the cathodes C0 to C4 are each set up to denote a particular digit less than five or that digit's complement on nine.

As each digit is set up on the tube 1, the state of the trigger 4. is changed by a pulse from the beginning element 5 if the digit requires that there should be a discharge between the anode A and the cathode C7. Similarly, the state of the trigger 4 is changed by a pulse from the end element 6, whenever a discharge is present between the anode A and either of the cathodes C7 and C8 when the tube 1 is cleared prior to setting up a further digit on the tube. The tube is cleared by means of a pulse to cathode C0 from the pulsing unit 8. The necessary connection is not shown for the sake of clarity.

Immediately after each digit is set up on the tube 1, a pulse is generated by the pulse generator 8 which, if the trigger 4 is on, passes through the gate 7 to the stepping input 2 of the tube 1 so as to step the discharge between the anode and any cathode to an adjacent cathode in a clockwise (as shown in the drawing) direction. For example, discharges between the anode and the cathodes C0 and C7 would be stepped so that they occurred between the anode and the cathodes C1 and C8. The pulse generated by the pulse generator 8 is delayed in the delay unit 9 and is then applied to the trigger 4 to put it off, or try to put it off, when the stepping operation has been completed.

Immediately after the stepping operation has been completed the trigger 19 is put on by a pulse from the pulsing unit 8 to open the gates 10 to 16. The trigger 19 is put off again to close these gates immediately before the switching tube 1 is cleared.

A specific example of the operation of the selector will now be taken. Let the multiplier be 57239. The least significant digit 9 is first set up on the tube 1 as discharges between the anode A and the cathodes C0 and C7. As the discharge to the cathode C7 becomes established, the trigger 4, is put on. The gate 7 is thereby opened and a pulse from the pulse generator 8 steps the discharges so that they now take place between the anode A and cathodes C1 and C8.

Therefore, when the trigger 19 is put on, the lines X1 and Subtract are energised to indicate a multiplier factor −1. This, in turn, indicates that the first multiple of the multiplicand should be subtracted from the contents of the accumulator. The trigger 4 is then put off by means of the pulse from the pulse generator 8 delayed by the delay line 9.

The trigger 19 is then put off, the tube 1 is cleared and the trigger 4 is again put on by means of a pulse created by the end element 6. Next, the next greater significant digit 3 of the multiplier is set up on the tube 1 as a discharge between the anode A and the cathode C3. As there is no discharge to either of the cathodes C7 and C8, the trigger 4 remains on. The gate 7 thus remains open and a pulse from the pulse generator 8 steps the discharge from the cathode C3 to the cathode C4. On this occasion, when the trigger 19 is put on only the line X4 is energised to indicate a multiplier factor of 4. This indicates that the fourth multiple of the multiplicand should be added to the contents of the accumulator.

It will, of course, be understood that in the meantime a shift will have occurred relatively between the multiplicand register and the accumulator in the arithmetical organ of the engine of which the translator forms part, so that in effect the fortieth multiple of the multiplicand will be added to the accumulator. This relative shift may; for example be obtained by shifting the contents of the arithmetical register on stage in the direction of increasing significance, by shifting the contents of the accumulator one stage in the direction of decreasing significance or by means of a shifting tree interposed between the register and the accumulator.

The next event in the sequence of operation is that the trigger 4 is put off by means of the delayed pulse from the pulse generator 8. The trigger 19 is then put off, the tube 1 is cleared and, as there is no discharge to either of the cathodes C7 and C8, the trigger 4 remains off.

Next, the next greater significant digit 2 of the multiplier is set up on the tube 1 as a discharge between the anode A and the cathode C2. The trigger 4 remains off and the gate 7 remains closed. The pulse from the pulse generator 8 does not, therefore, reach the tube 1 to step the discharge and a pulse from the delay line 9 tries to put the trigger 4 off. When the trigger 19 is put on, the line X2 is energised to indicate a multiplier factor of 2. This indicates that the second (actually the two-hundredth) multiple of the multiplicand should be added to the accumulator. The trigger 19 is then put off, the tube 1 is cleared and the trigger 4 remains off.

The multiplier digit 7 is then set up on the tube 1 as discharges between the anode A and the cathodes C2 and C7. As the discharge to the cathode C7 is set up, the trigger 4 is put on by a pulse from the beginning element 5. A pulse from the pulse generator 8 passes through the gate 7 and steps the discharges in the tube 1 to the cathodes C3 and C8. Thus, when the trigger 19 is put on, outputs appear on the lines X3 and Subtract indicating a multiplier factor of −3 and that the third (actually the three-thousandth) multiple of the multiplicand should be subtracted from the accumulator. The trigger 4 is put off by a pulse from the delay 9, the trigger 19 is put off by a pulse from the pulsing unit 8 and the trigger 4 is put on again as the tube 1 is cleared.

The multiplier digit 5 is then set up on the tube 1 as discharges between the anode A and the cathodes C4 and C7. As the discharge to the cathode C7 is established, a pulse from the beginning element 5 puts the trigger 4 off and shuts the gate 7 so that the discharges on the tube 1 are not stepped by the pulse from the pulse generator 8. When the trigger 19 is put on, the lines X4 and Subtract are, therefore, energised to indicate a multiplier factor of −4 and that the fourth (actually the forty-thousandth) multiple of the multiplicand should be substracted from the accumulator. The trigger 19 is then put off and the tube 1 is cleared, a pulse from the end element 6 puts the trigger 4 on.

The next greater significant figure is assumed to be zero and this is set up on the tube 1 as a discharge between the anode A and the cathode C0. The trigger 4 remains on and a pulse from the pulse generator 8 steps the discharge in the tube 1 so that it takes place to the cathode C1. The trigger 4 is then put off by the pulse from the delay 9. Meanwhile the trigger 19 is put on and the line X1 is energised to indicate a multiplier factor of 1. This, in turn, indicates that the first (actually the one-hundred-thousandth) multiple of the multiplicand should be added to the accumulator. The trigger 19 is again put off and the tube 1 is then cleared and the trigger 4 remains off. If any further zeroes are set up on the tube 1, only the line X0 is energised indicating a multiplier factor of 0 and, further, indicating that no further multiplication is required.

It will be understood that the invention is not limited in scope to the use of a cold cathode switching tube in the multiplier register. It will be clear to those versed in the art that any two-state element or device may be substituted for each of the discharge paths from the anode A to the cathodes C1 to C5 and also that a single two-state device may be substituted for the two discharge paths between the anode A and the cathodes C7 and C8. In this case, a system of AND gates and inhibiting gates controlled by a trigger, similar to the trigger 4 in Figure 2, would be necessary to ensure that a multiplier factor one greater than the multiplier digit (or the complement on nine of the multiplier digit, as the case may be) held in the multiplier register is selected when required by the rule set forth in Table 1.

For instance, a circuit similar to that shown in Figures 13 and 15 of the specification filed in pursuance of copending patent application No. 415,609 could be adapted to deal with the selection of multiplier factors from multiplier digits fed to it in an order of increasing significance. In this case, as shown in Figure 3, five trigger tubes (for example, of the type sold under the trade designation G1/370K) are required to store one multiplier digit at a time. The five trigger tubes 1/8, 2/7, 3/6, 4/5 and >4, are set up in a five-element code similar to the the six-element code but with no positive representation of the 0/9 element. A trigger 101 performing the same function as the trigger >4 is connected to the trigger tube >4 holding the >4 code element. The trigger 101 is first put off and a pulse is then applied to the trigger tube >4 before each multiplier digit is cleared from the trigger tubes, and after each new multiplier digit is set up on the trigger tubes, another pulse is applied thereto. If the trigger tube >4 holding the >4 code element is flashed when a pulse is applied thereto, the state of the trigger is changed. The output of the trigger 101 controls gates 121 to 129 connected to the remaining trigger tubes so that the digit indicated by the output therefrom is increased by unity when required by the rule set forth in Table 1. The output from the trigger tube >4 holding the >4 code element provides an indication of the sign of the multiplier factor.

I claim:

1. A translator for deriving multiplier factors from a succession of multiplier digits and comprising a single-state decimal multiplier register, means for sending single multiplier digits to the said register successively in an order of increasing significance, said multiplier register including means for recording whether a multiplier digit held in the register is a digit N which is less than five or a digit $(9-N)$ which is greater than four and means connected to said multiplier register to determine a multiplier factor F such that:

(1) if the multiplier digit held in the register is less than five
- (*a*) F equals N if the next less significant multiplier digit previously held in the register was less than five, or
- (*b*) F equals $(N+1)$ if the next less significant multiplier digit previously held in the register was greater than four, or (2) if the multiplier digit held in the register is greater than four
- (*a*) F equals minus N if the multiplier digit previously held in the register was greater than four, or
- (*b*) F equals minus $(N+1)$ if the multiplier digit previously held in the register was less than five.

2. A translator for deriving multiplier factors from a succession of multiplier digits and comprising a single-stage decimal register consisting of a plurality of two-state elements, input means for setting up the two-state elements with single multiplier digits successively in an order of increasing significance in accordance with a predetermined code such that a single predetermined two-state element is put in a predetermined state if, and only if, a multiplier digit set up in the register is greater than four and at least some of the remainder of the two-state elements are put in states representing a digit N (less than five) equal to the multiplier digit or the multiplier digit's complement on nine if the multiplier digit is greater than four, storage means connected to the predetermined two-state element for providing a predetermined output when, of two multiplier digits set up successively on the register, one is greater than four and the other is less than five and means connected to said register for providing an output from the register representing (*a*) a multiplier factor N or (*b*), when the storage means provides the predetermined output, a multiplier factor $(N+1)$ and for indicating a negative multiplier factor if, and only if, the predetermined two-state element is set up in its predetermined state.

3. A translator as claimed in claim 2 and wherein the two-state elements comprise some of the anode-to-cathode discharge paths of a cold-cathode switching tube.

4. A translator as claimed in claim 3 and wherein the input means is connected to the cold-cathode switching tube so as to set up a discharge to a noughth cathode of the tube if a multiplier digit is a nought or a nine, to a first cathode, adjacent to the noughth cathode in a predetermined direction round the cathode ring, if the multiplier digit is a one or an eight, to a second cathode adjacent the first cathode if the multiplier digit is a two or a seven, to a third cathode adjacent the second cathode if the multiplier digit is a three or a six, to a fourth cathode adjacent the third cathode if the multiplier digit is a four or a five and to a further cathode, separated from the other cathodes by at least one cathode in both directions round the cathode ring, if the multiplier digit is greater than four.

5. A translator as claimed in claim 4 and wherein the storage means comprises a trigger connected to the said further cathode and to a cathode adjacent to the further cathode in the predetermined direction round the cathode ring so that the state of the trigger is changed when a discharge to the said further cathode is established and when a discharge to either of the cathodes is extinguished, means for clearing the switching tube prior to its being set up with a new multiplier digit and means for putting the trigger off immediately before the switching tube is cleared.

6. A translator as claimed in claim 5 and wherein the means for providing an output from the register comprises means for stepping a discharge from any cathode to an adjacent cathode in the said predetermined direction round the cathode ring whenever the trigger is on after each new multiplier digit is set up in the switching tube and means for connecting an output line to each of the first cathode, the second cathode, the third cathode, the fourth cathode, a fifth cathode adjacent the fourth cathode and for connecting an output line to both the said further cathode and the cathode adjacent thereto.

7. A translator as claimed in claim 2 and wherein the two-state elements comprise a first trigger tube arranged to be flashed if a multiplier digit is a one or an eight, a second trigger tube arranged to be flashed if the multiplier digit is a two or a seven, a third trigger tube arranged to be flashed if the multiplier digit is a three or a six, a fourth trigger tube arranged to be flashed if the multiplier digit is a four or a five and a fifth trigger tube arranged to be flashed if the multiplier digit is greater than four and wherein the storage means comprises a trigger connected to the fifth trigger tube, means being provided for putting the trigger off, for then applying a pulse to the fifth trigger tube to change the state of the trigger if the fifth trigger tube is flashed, for setting up the next more significant multiplier digit on the trigger tubes and for then applying a further pulse to the fifth trigger tube to change the state of the trigger if the fifth trigger tube is flashed.

8. An electrical translator for deriving multiplier factor signals for effecting short-cut decimal multiplication and comprising a single-stage decimal digit register which stores decimal digits in a binary-decimal code one binary element of which indicates whether the coded digit is or is not greater than four, a two-state device connected to the said register, means for causing the state of said two-state device to change when a decimal digit greater than four is applied to the said register, means for setting up multiplying factor signals under control of the said register and the said two-state device and means for clearing the said register and two-state device.

References Cited in the file of this patent

UNITED STATES PATENTS 2,486,809 Stibitz ---------------- Nov. 1, 1949

OTHER REFERENCES

Description of a Relay Calculator, Harvard University Press, 1949, pages 88–117 relied on.